United States Patent

[11] 3,585,339

[72] Inventor Terry O. Hockenberry
Pittsburgh, Pa.
[21] Appl. No. 759,833
[22] Filed Sept. 16, 1968
[45] Patented June 15, 1971
[73] Assignees Dr. Everard M. Williams
Pittsburgh, ;
Dr. Terry O. Hockenberry
Fox Chapel, Pa., part interest to each

[54] POWER SUPPLY AND ADAPTIVE CONTROL SYSTEM FOR EDM APPARATUS
10 Claims, 10 Drawing Figs.

[52] U.S. Cl. .................................................. 219/69
[51] Int. Cl. .................................................. B23k 9/16
[50] Field of Search .......................................... 219/69 G, 69 C, 69 P, 69

[56] References Cited
UNITED STATES PATENTS
2,996,638 8/1961 Webb ........................ 219/69 (G) X Primary Examiner—J. V. Truhe
Assistant Examiner—Hugh D. Jaeger
Attorney—Buell, Blenko and Ziesenheim ABSTRACT: A adaptive control system can be used for EDM apparatus having a workpiece and an electrode tool, together with means for establishing repetitive electric discharges across a gap between the tool and said workpiece. The control system comprises reversible drive means for moving the tool toward and away from said workpiece to establish the discharge gap, a first circuit produces a series of control pulses corresponding with each rise in gap voltage preparatory to each gap breakdown and discharge. A second circuit is coupled to the first circuit for producing an output wave form in response to the control pulses and synchronized thereby to the waveform of the gap voltage. A third circuit is coupled to the second circuit and the first circuit intermittently for interrupting the output waveform. The third circuit is conductive during portions of successive cycles of the waveform so that the successive portions are varied in length in proportion to the rises of the gap voltage. A fourth circuit is coupled to the third circuit and to the drive means for converting the waveform portions into an averaged control signal for operating the drive means to control the width of discharge gap.

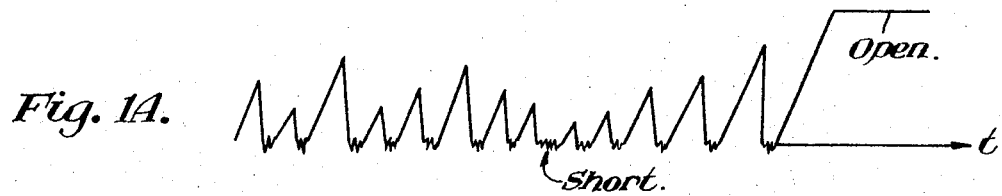
Fig. 1A.
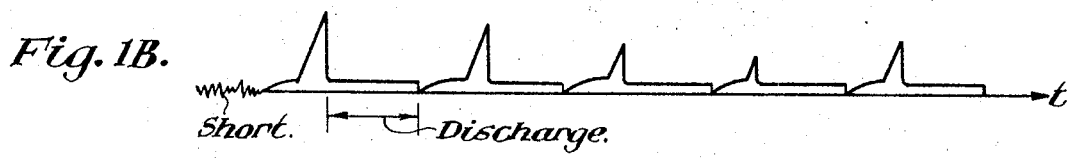
Fig. 1B.
Fig. 1C.
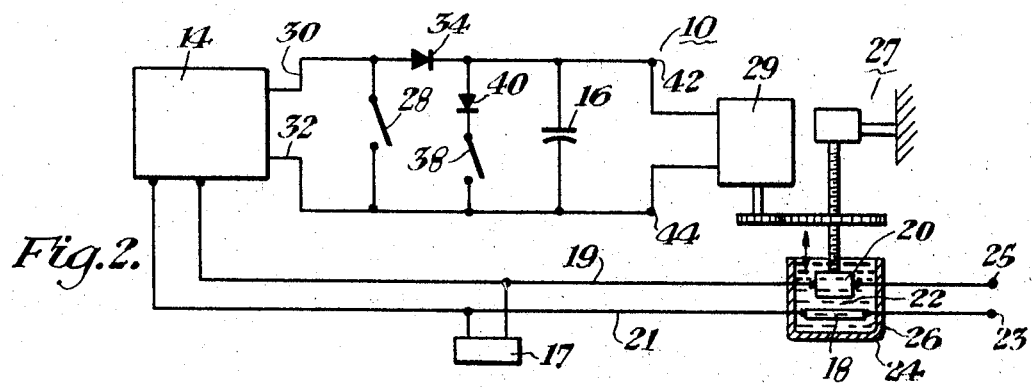
Fig. 2.
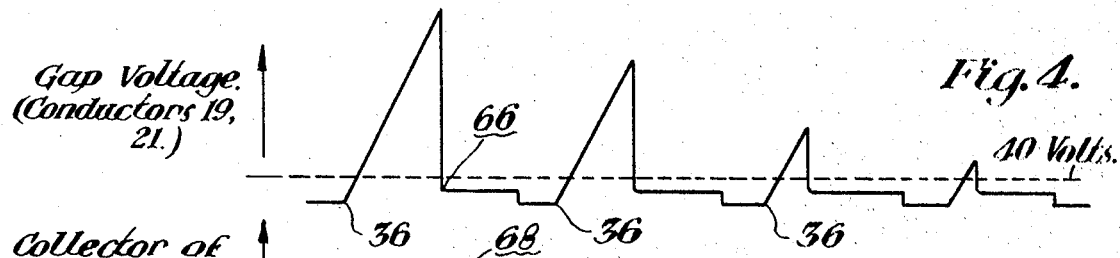
Fig. 4.
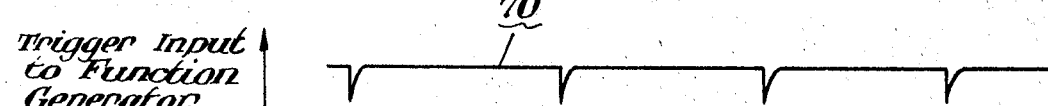
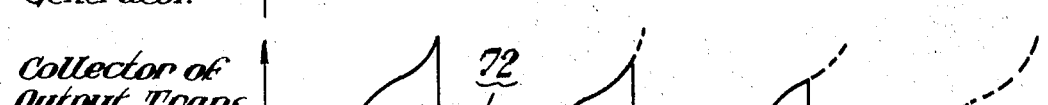
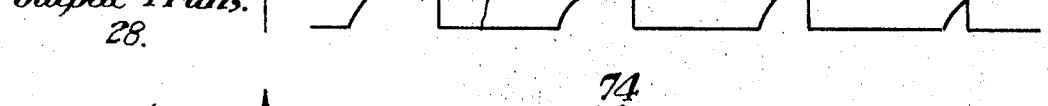
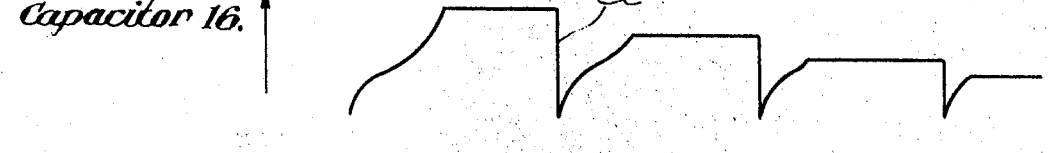

INVENTOR
Terry O. Hockenberry

HIS ATTORNEYS

INVENTOR
Terry O. Hockenberry.

HIS ATTORNEYS

POWER SUPPLY AND ADAPTIVE CONTROL SYSTEM FOR EDM APPARATUS

The present invention relates to a control system for EDM apparatus and the like, and more particularly to novel means for deriving a servo signal from a certain aspect of EDM gap voltage in order to control the electrode-to-workpiece gap spacing of EDM apparatus. Although not limited thereto, my invention is particularly useful with EDM apparatus having independently timed power supplies or with self-timed (dual charging rate) power supplied such as those disclosed in a copending, coassigned application by myself and Everard M. Williams, entitled "Power Supply Circuitry for Electric Discharge Machining Apparatus and the Like," filed Dec. 19, 1966, Ser. No. 602,724.

Throughout the brief history of electric discharge machining (EDM) apparatus, the precise control of discharge gap width has been a persistent problem. In the case of the well known relaxation type power supply, the average gap voltage of the apparatus provides a control signal almost proportional to the gap spacing. In the first practical application of this type of control system, as disclosed in the U.S. Pat. to No. 2,841,686, to Everard Williams, a differential signal derived from the average gap voltage (or voltage across a series impedance) and a reference or standard voltage was employed to actuate an electromechanical or hydraulic drive for adjusting the spacing between the electrode and workpiece. This system produces a linear control characteristic which overcontrols in some areas of the range of gap spacing and undercontrols in others. In addition, the system undesirably is subject to hunting. Nevertheless, the Williams arrangement is useful in many EDM applications.

On the other hand, in self-timed or independently timed EDM power supplies, the charge cycle is usually a very small interval in comparison to the discharge cycle. Hence, a change in gap breakdown voltage, as occasioned by variations in electrode-to-workpiece spacing scarcely affects the average gap voltage. The average gap voltage, therefore, is subject to little variation and is not a useful measure of EDM gap spacing. Accordingly, a control system based on an averaged gap voltage and its inherent simplicity are not appropriate for self-timed or independently timed EDM power supplies.

The gap spacing information in each of the three mentioned power supplies, i.e., relaxation, self-timed and independently timed, is contained essentially, however, in the charging intervals of the gap charge-discharge cycle. Idealistically, the charging voltages are illustrated as increasing linearly during the charging cycle. This linear ramp is not characteristic of certain EDM power supplies such as the exponential power supply of the aforementioned application. Although not essential for the operation of the circuitry, and system described herein, the concept of a linear charging ramp simplifies the presentation of the systemic wave form.

From FIGS. 1A, 1B and 1C it is seen from the idealistic waveforms for the relaxation, self-timed and independently timed power supplies, that the charging voltage stops rising and abruptly drops as each gap discharge is initiated. The voltage level to which the gap voltage rises during each charging cycle depends on the gap spacing and more accurately on the effective gap spacing between the electrode tool and the workpiece. The effective gap spacing may be defined as the minimum distance between either the workpiece and the electrode or the workpiece and conductive particles in contact with the workpiece or electrode.

From FIG. 1A of the drawings, it will be observed that the charging portion (from which the Williams' control signal is derived) of the charge-discharge gap voltage cycle constitutes a very large portion of the total gap cycle. The gap voltage curves of FIGS. 1B and 1C represent typical gap voltage curves characteristically exhibited by self-timed and independently timed EDM power supplies, respectively. Here the charging portion is so short in relation to the entire charge-discharge cycle that the average gap voltage becomes almost invariable with changes in gap width and therefore unusable as a basis for gap width control. With decreases in repetitive gap discharge rates the average gap voltage becomes even less variable.

I overcome these disadvantages of the prior art with the provision of an EDM control system comprising a function generator connected through switch means to a signal capacitance. The function generator is turned on when the gap voltage commences to rise from zero. The time duration of the function or series of output pulses generated by the function generator desirably are the same as that of the portions of the gap voltage waveform. The output of the function generator is coupled to the signal capacitor until each discharge occurs across the EDM gap. At such time, the switch means are opened and the signal capacitor maintains a residual charge equal to the output voltage of the function generator at the termination of the gap charging interval. The signal capacitor thereafter remains charged at this level until the next gap charge interval begins. The signal capacitor therefore bears an average voltage which, however, is proportional not to average EDM gap voltage but rather to gap charging voltage which alone is indicative of gap conditions. The signal capacitor voltage provides a very accurate gap control signal. The average voltage appearing across the signal capacitor is determined by the function generator voltage when the switch means are opened. In accordance with my invention, the average voltage across the signal capacitor is amplified for use as a servo voltage, which in turn actuates suitable apparatus for positioning the tool electrode with respect to the workpiece.

The shape of the control characteristic afforded by my power supply and control system is essentially that of the voltage output of the function generator. This shape can be changed rapidly (between discharges if necessary) by changing the shape of the function generator output waveform. It is of course desirable to change the shape of the control characteristic to meet varying gap conditions and machining requirements. For example, when beginning an EDM machining operation, an unstable servo condition normally exists until the electrode "seats" in the work. During this phase of operation, it is desirable to change the shape of the control characteristic rather drastically as described in detail below. This can be done automatically by sensing the stability of the machining operation and changing the control characteristic accordingly simply by changing the function generator waveform. The null point of the control signal curve likewise can be changed by simply changing the function generator waveform in order to select another nominal gap width for a different machining operation.

The function generator is triggered in accordance with my invention to initiate its output when the gap voltage begins to rise. Otherwise, the function generator is an independent circuit, which generates a waveform functionally independent of the gap voltage waveform. The two waveforms are synchronized only with respect to time.

I accomplish these desirable results by providing an adaptive control system for EDM apparatus having a workpiece and an electrode tool, and means for establishing repetitive electric discharges across a gap between said tool and said workpiece, said system comprising reversible drive means for moving said tool toward and away from said workpiece to establish said gap, first circuit means for producing a series of control pulses corresponding with each rise in gap voltage preparatory to each gap breakdown and discharge, second circuit means coupled to said first circuit means for producing an output waveform in response to said pulses and synchronized thereby to the waveform and to said first circuit means of said gap voltage, third circuit means coupled to said second circuit means for chopping said output waveform, said third circuit means being conductive during portions of successive cycles of said waveform so that said portions are varied in length in proportion to the rises of said gap voltage, and fourth circuit means coupled to form said third circuit means and to said drive means for converting said waveform portions into an averaged control signal for operating said drive means.

I also desirably provide a similar adaptive control system wherein an input circuit is coupled to said first circuit means, said input circuit including a semiconductive switch and capacitance storage means for producing control pulses in said first circuit means of usable width from nearly vertical gap voltage rises characteristic of extremely rapid repetitive discharge rates.

During the foregoing discussion, various objects, features and advantages of the invention have been set forth. These and other objects, features and advantages of the invention together with structural and circuit details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIGS. 1A, 1B and 1C are graphical representations showing typical gap voltage waveforms of EDM apparatus supplied with relaxation, self-timed and independently timed power supplies respectively;

FIG. 2 is an abbreviated circuit schematic showing one arrangement of an adaptive control system arranged in accordance with my invention;

FIG. 4 is a graphical representation of voltage waveforms at key points in the input and output circuits of FIG. 3;

Figure 5:
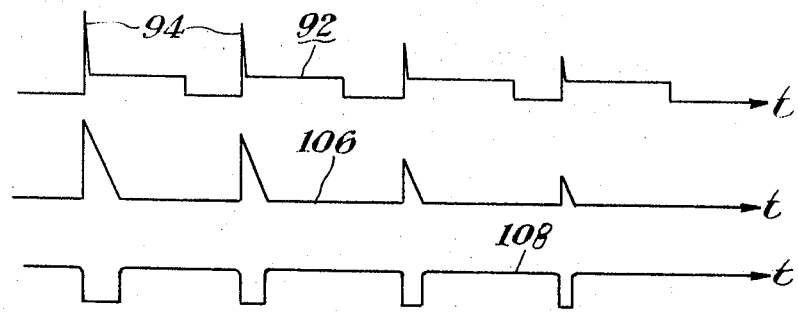
FIG. 5 is another graphical representation of the variation in gap and input capacitor voltages with reference to a voltage in the input circuit of FIG. 3A.

Referring now more particularly to FIGS. 2 and 5 of the drawings, the adaptive control system 10 of FIG. 2 is arranged for accommodating a EDM gap voltage having a typical waveform approximating the curve 12 of FIG. 5. In this arrangement of the invention, a function generator denoted generally by reference character 14 has its output terminals coupled to signal capacitor 16 and its input terminals to a juxtaposed workpiece 18 and electrode tool 20. The workpiece and electrode tool 18, 20 are spaced to afford a discharge gap 22 and are immersed in a tank 24 containing a dielectric fluid 26 in accordance with the usual practice. The tool 20 is mounted on a suitable and known positioning device 27 actuated by known and reversible drive means 29. The workpiece and electrode tool 18, 20 are coupled via conductors 19, 21 to an input circuit 17 for the function generator 14. The voltage of the gap 22 therefore serves to trigger the function generator 14, and the circuit 17 (FIG. 3) for synchronizing the waveform of the EDM gap 22 with that of the function generator output. A self-timed or independently timed power supply (not shown) is coupled to terminals 23, 25 for inducing a repetitive discharge across the EDM gap 22. A suitable self-timed power supply is described and claimed in the aforementioned application.

A solid-state switch or the like denoted generally by the reference character 28 is connected across output leads 30, 32 of the function generator 14. In this arrangement the function generator is of known construction such as that identified as Type 400 available from Exact Electronics Inc., Hillsboro, Oregon.

Suitable circuitry described below is provided for opening the switch 28 when gap voltage begins to rise and the function generator output is to be coupled to the capacitor 16 and for closing the switch 28 at the instant that electrical breakdown occurs at the EDM gap 22. The switch 28 effectively short-circuits the function generator output until its output waveform is desired. At that time, opening of switch 28 permits the function generator to charge the capacitor 16. At the instant that electrical breakdown of the EDM gap 22 occurs switch 28 is again closed to segregate the function generator output from the signal capacitor 16. A signal voltage therefore is stored on the capacitor which is related only to the time duration of the voltage rise or gap charging voltage rather than to an averaged EDM gap voltage.

In order to preserve a voltage on the signal capacitor 16, when the switch 28 closes, a diode 34 is inserted in series with the charging path for the capacitor 16. Thus, when the switch 28 closes, the diode 34 becomes reversed-biased and the voltage is maintained on capacitor 16. When the gap voltage begins rising again, (FIG. 4, item 36) after a discharge at the gap 22, a similar switch 38 is closed to initiate rapid discharge of the capacitor 16. Directional diode 40 is connected in series with the discharge switch 38. The charging and discharging of the signal capacitor 16, controlled in this manner by the function generator 14, develops a control signal across output terminals 42, 44. This signal is suitably amplified and utilized to actuate the electrode positioning means 27—29 (FIG. 2).

Figure 3:
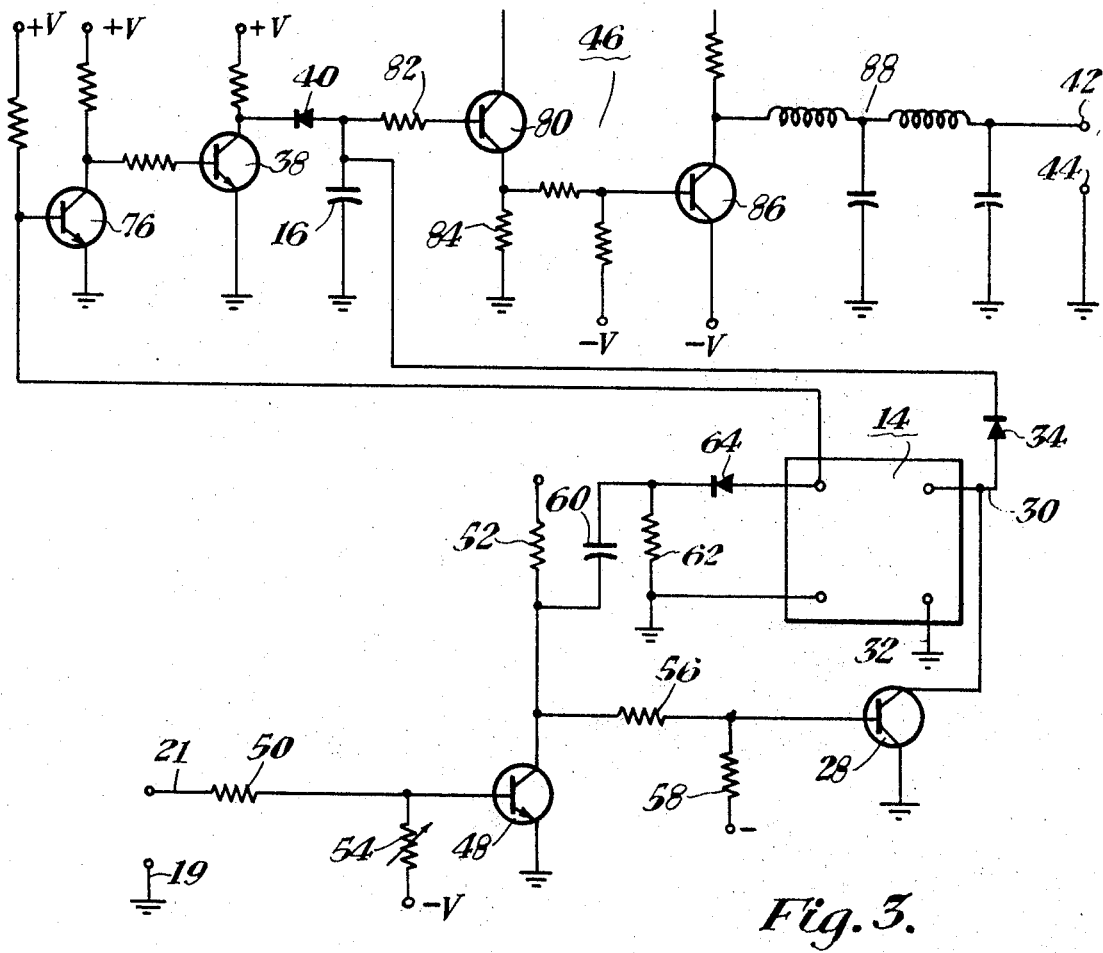
FIG. 3 is a detailed circuit schematic of the arrangement of FIG 2 and illustrating in addition circuit means for triggering the function generator.

Referring now to FIG. 3 of the drawings, a detailed circuit arrangement 46 is disclosed for synchronizing and triggering the function generator 14 with respect to the repetitive discharges across EDM gap 22 and for controlling the charging and discharging of the signal capacitor 16. In this arrangement of my invention, the function generator switch 28 of FIG. 2 is provided in the form of a transistor 28a, the emitter-collector circuit of which is coupled across the output leads 30, 32 of the function generator 14. The capacitor discharge switch 38 likewise is provided in the form of a transistor 38a with the directional diode 40 being connected between its collector electrode and the signal capacitor 16.

Transistor 28a and its associated components comprise a threshold circuit which is turned on when transistor 28a is switched off. With this arrangement the function generator 14 is triggered on by rising voltage of EDM gap 22 to charge the signal capacitor 16. In this example, the threshold circuit includes transistor 48, resistances 50, 52 and potentiometer 54, and is arranged to turn transistor 48 off (and transistor 28a on) in order to interrupt the function generator output at the instant each discharge occurs across the EDM gap 22. Upon the occurrence of such discharge, the gap voltage drops from a peak charging of about 500 volts by way of example, to a discharge voltage which may be in the range of 15 to 25 volts. When this discharge voltage appears across the EDM gap 22 the function generator 14 is shorted, i.e., transistor 28a is turned on and transistor 48 is turned off. In consequence, the threshold voltage must be set above the highest discharge voltage expected. In this example, the threshold circuit defines a threshold voltage of 40 volts. Thus, the forward bias resistance 50 and the reverse bias resistance 54 are selected such that the transistor 48 is turned on when the rising gap voltage reaches 40 volts.

The on-off actions of the transistors 28a, 48 are tied together by means of resistors 52, 56, 58. When transistor 48 is turned on, transistor 28a is turned off by a reverse bias voltage developed across resistor 58. On the other hand, when transistor 48 is turned off, transistor 28a is turned on by a forward bias current through resistances 52, 56.

The aforementioned threshold circuit includes a triggering circuit for the function generator 14. The trigger circuit comprises capacitor 60, resistance 62 and diode 64. Capacitance 60 and resistance 62 function as a differentiator circuit, while diode 64 eliminates the positive pulses from the differentiated waveform. Thus, negative triggering pulses appear across resistance 62 when transistor 48 is turned on.

The waveforms at key points in the circuit of FIG. 3 are shown in FIG. 4. Waveform 66 denotes the variable EDM gap voltage supplied on conductors 19, 21, and, by way of example, is representative of a decreasing gap width condition. Waveform 68 is the voltage at the collector of input transistor switch 48. The waveform 70 denotes the triggering pulses supplied to the function generator 14 whereby the output of function generator is synchronized with the EDM gap voltage. The voltage on the collector of the output transistor switch 28a is denoted by waveform 72, while waveform 74 denotes the signal voltage developed by capacitor 16. A comparison of the curves of FIG. 4 reveals that the signal waveform 74 and other waveforms of the FIG. 3 circuit occur only during the very brief charging portions of the gap voltage waveform.

As noted previously, the collector of the output transistor switch 28a is connected through diode 34 to the signal capacitor 16. This circuit operates to store the peak voltage appearing on the collector of transistor 28a each time a pulse is transmitted thereto. The diode 34 prevents the signal capacitor 16 from discharging immediately back though the transistor switch 28 when the latter turns on in conformance with the waveform 72 of FIG. 4.

The signal capacitor 16 must be reset each time the function generator voltage begins to rise because this rise indicates that a new piece of information is ready to be stored in the capacitor 16. Therefore, capacitor 16 is discharged simultaneously with the triggering of the function generator 14 by connecting the negative triggering voltage through an inverter stage represented by the transistor 76 to the discharge switch represented by transistor 38a. The negative pulse of the triggering input turns transistor 76 off and transistor 38a on, so that the signal capacitor 16 discharges through the directional diode 40. The diode 40 prevents the signal capacitor 16 from being charged through resistance 78 when transistor switch 38a is turned off.

The average voltage on the signal capacitor 16 becomes the servo signal. Desirably, the capacitance of the signal capacitor 16 is small so that the charging and discharging current can be maintained at a low level. With a small value of signal capacitance, the circuit employed to detect the voltage on the signal capacitor 16 desirably has a relatively high input impedance to avoid discharging the signal capacitor 16 during detection. In a typical, nonlimiting example, the capacitance of the signal capacitor 16 may be of the order of 1,000 picofarads, in which case the aforementioned charging and discharging currents are of the order of 100 milliamps. Under such conditions, the time constant of the signal capacitor 16 is about 3 milliseconds.

The detector circuit including transistor 80 and resistances 82, 84, for the servo signal is an emitter-follower configuration having a relatively high input impedance and low output impedance. The detector circuit therefore does not discharge the signal capacitor 16 to any substantial degree.

Transistor 86 and associated components constitute an amplification stage, which also shifts the signal voltage so that the voltage on the emitter of transistor 86 swings from a negative voltage to a positive voltage (double-ended). The signal voltage across resistor 84 on the other hand swings from zero to a positive value (single-ended). A low-pass filter circuit 88 is coupled between the transistor 86 and signal output terminals 42, 44 to reduce substantially the high frequency components of the signal output voltage.

The control circuit just described functions well at low (about 1,000 Hz.) and intermediate (about 50,000 Hz.) gap discharge frequencies. However, at high frequencies (in the order of 200,000 Hz.) it is essential for the gap voltage to rise rapidly (within less than 1 microsecond) so that significant time is not loss in initiating each discharge. For the latter application, obviously the control circuit must be capable of responding with extreme rapidity.

Figure 3A:
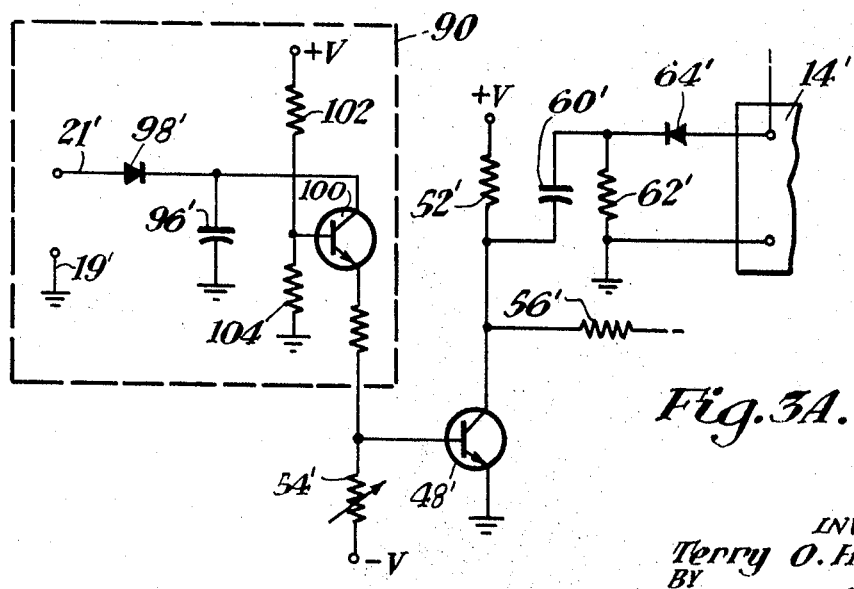
FIG. 3A is a partial, circuit schematic of another form of my adaptive control system and showing an alternative mode of triggering the function generator.

One arrangement for endowing the control circuit of my invention with a more rapid response characteristic is illustrated in FIGS. 3A and 5 of the drawings. In this modification of my invention the input circuit is modified to include a high frequency input section denoted generally by the reference character 90, which adapts the control circuit of FIG. 3A for use with a gap voltage typified by curve 92 in FIG. 5 and having almost perpendicular voltage rises and drops 94.

In the modified input circuit of FIG. 3A, input capacitor 96 charges through diode 98 to a voltage proportional to the gap voltage, as the gap voltage rises. At the instant of electrical breakdown in the gap (FIG. 5, curve 92) the gap voltage falls rapidly, diode 98 becomes reversed biased and capacitor 96 discharges through transistor 100. The transistor 100 and resistors 102, 104 comprise a constant-current discharge circuit for the input capacitor 96, with the result that the voltage on capacitor 96 decreases linearly with time. The discharge current flowing through transistor 100 to the base electrode of transistor 48 turns the latter on. Desirably, the parameters of the discharge circuits including the transistor 100 and resistances 102, 104 are established such that the input capacitor 96 is discharged in less than 2 microseconds. The remainder of the control circuit thereafter functions as described previously with reference to FIG. 3 to establish an input control signal for the function generator 14. The voltage relationships between the alternate input circuit 90 and the balance of the control circuit is illustrated in FIG. 5. As noted previously curve 92 represents a high frequency gap discharge, while curves 106 and 108 are voltage curves across input capacitor 96 and on the collector of the transistor 100 respectively. The gap voltage curve 92 in this example is representative of an increasing gap width.

As evident from FIG. 5, the extremely narrow voltage peaks 94 of the gap voltage curve 92 are translated into pulses of measurable and usable width by means of the input capacitor 96. Therefore, the transistor switch 48 coacting with the transistor switch 28a is able to control the function generator 14 in order to produce a usable output control signal on terminals 42, 44 (FIG. 3).

Figure 7:
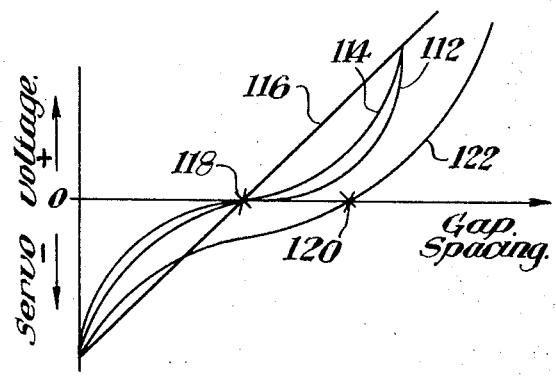
FIG. 7 is a graphical representation of typical shapes of the control characteristic of my adaptive control system resulting from corresponding use of the waveforms of FIG. 6.
Figure 6:
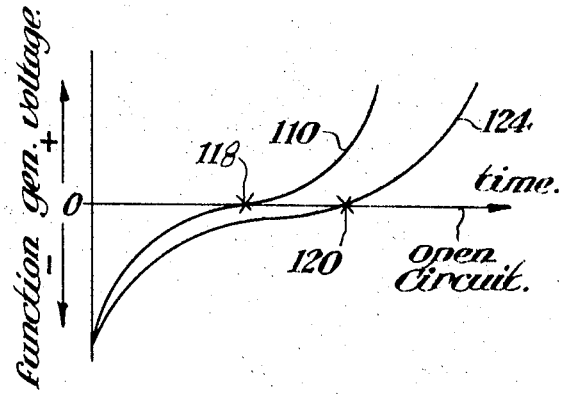
FIG. 6 is a graphical representation of typical output waveforms of my control system.

The control characteristic of my invention is illustrated in FIGS. 6 and 7 of the drawings. In FIG. 6, the function generator output, $N_{(t)}$, is plotted against time. In this example of the invention, the output of the function generator 14 is caused to assume the shape of curve 110 of FIG. 6, in a known manner. Comparing FIGS. 6 and 7 it will be seen that a similar waveform represented by curve 112 (FIG. 7), is characteristic of the signal voltage across signal capacitor 16 (FIGS. 2 and 3). The shape of the control characteristic can be changed rapidly by changing the shape of the function generator output waveform by, for example, manual selection of a different array of internal semiconductive switches employed in the function generator circuit and arranged to shape the waveform in accord with known precepts. Suitable means for thus changing the slope of shape of the output waveform are likewise available from Exact Electronics, Inc. under their designation Type 4002.

An important feature of my invention is the shapewise identity of the control characteristic curve 112 or 122 (FIG. 7—servo voltage vs. gap spacing) and the function generator output waveform 110 or 124 (FIG. 6—voltage vs. time). For a specific machining application, a quick-selection of gap spacing and/or attendant control characteristics can be made, simply by varying the output of the function generator as outlined above.

A variable shape of control characteristic is desirable to meet varying or variable gap conditions and differing machining applications. For example, at the beginning of an EDM operation, an unstable servo condition normally exists until the electrode 20 "seats" in the workpiece 18, (FIG. 2). In this phase of the machining operation, it is usually desirable to begin with a control characteristic corresponding to the curve 112 in FIG. 7. The control characteristic is then progressed to that defined by curves 114 and 116 respectively as the electrode 20 "seats" in the workpiece 18. This is accomplished by varying, as described above, the output waveform of the function generator 14 to select a similar shape of the output waveform. For example, waveform 110 (FIG. 6) corresponds to control characteristic 112 (FIG. 7), to change the control characteristic 112, 114 or 116 accordingly by selecting the proper function generator waveform.

As is well known in the art of EDM operations, differing types of machining operations with the same apparatus require differing nominal gap widths. In FIG. 7 the control characteristic curves 112—116 in this example control to the same gap width 118 corresponding to the common null point of these curves. A different nominal gap width is selected by changing the control characteristic by accordingly changing the function generator waveform (curve 124) to produce a control characteristic curve 122 having a different and corresponding null point 120. For this purpose the function generator waveform is changed as described previously.

From the foregoing it will be seen that novel and efficient forms of power supply and adaptive control systems for EDM apparatus have been described herein. While I have shown and described certain presently preferred embodiments of the invention and have illustrated presently preferred methods of practicing the same, it is to be distinctly understood that the invention is not limited thereto but may be otherwise variously embodied and practiced within the scope of the following claims.

I claim:

1. An adaptive control system for EDM apparatus having a workpiece and an electrode tool, and means for establishing repetitive electric discharges across a gap between said tool and said workpiece, said system comprising reversible drive means for moving said tool toward and away from said workpiece to vary the width of said gap, first circuit means for producing a series of control pulses corresponding with each rise in gap voltage preparatory to each gap breakdown and discharge, second circuit means coupled to said first circuit means for producing an output waveform in response to said pulses and synchronized thereby to the waveform of said gap voltage, third circuit means coupled to said second circuit means and to said first circuit means for intermittently interrupting said output waveform, said third circuit means being conductive during portions of successive cycles of said waveform so that said portions are varied in length in proportion to the rises of said gap voltage, and fourth circuit means coupled to said third circuit means and to said drive means for converting said waveform portions into an averaged control signal for operating said drive means whereby the shape of a control characteristic with respect to said gap width is substantially identical to the shape of said waveform.

2. The combination according to claim 1 wherein an input circuit is coupled to said first circuit means, said input circuit including a semiconductive switch and capacitance storage means for producing control pulses in said first circuit means of usable width from nearly vertical gap voltage rises characteristic of extremely rapid repetitive discharge rates.

3. The combination according to claim 1 wherein said fourth circuit means include a signal capacitor coupled to said third circuit means for charging thereby during the conductive periods of said third circuit means.

4. The combination according to claim 3 wherein said fourth circuit means further includes a discharging circuit coupled to said capacitor and coupled additionally to said first circuit means such that said discharge circuit is rendered conductive by said control pulses.

5. The combination according to claim 1 wherein said control pulses are produced by a semiconductive switch forming part of said first circuit means, the conductivity of said third circuit means being controlled by a semiconductive switch coupled across the output of said second circuit means.

6. The combination according to claim 5 wherein said first circuit and said third circuit semiconductive switches are coupled through reverse biasing circuitry so that either one of said semiconductive switches is switched on at the instant the other of said semiconductive switches is switched off.

7. An adaptive control system for EDM apparatus and the like having a repetitive electrical discharge gap and means for adjusting the width of said gap, said system comprising a first circuit for producing an output waveform, a second circuit coupled across said gap for producing a series of discharge pulses across said gap, a third circuit coupled to said first circuit and across said gap for synchronizing and integrating said waveform and said series of pulses to develop an output signal capable of energizing said gap adjusting means in accordance with said waveform, and a storage and switching circuit coupled to said first and third circuits and across said gap for producing control pulses in said first circuit of usable length from nearly vertical gap voltage rises characteristic of extremely rapid repetitive discharge rates, said storage and switching circuit being conductive during portions of successive cycles of said waveform.

8. The combination according to claim 7 wherein said third circuit includes a signal capacitor coupled for charging by said synchronized waveform.

9. An adaptive control system for EDM apparatus and the like having a repetitive electrical discharge gap and means for adjusting the width of said gap, said system comprising a first circuit for producing an output waveform, a second circuit coupled across said gap for producing a series of discharge pulses across said gap, a third circuit coupled to said first circuit and across said gap for synchronizing and integrating said waveform and said series of pulses to develop an output signal capable of energizing said gap adjusting means in accordance with said waveform, said third circuit including a signal capacitor coupled for charging by said synchronized waveform, and a discharging circuit coupled to said capacitor and to said first circuit so that said discharge circuit is rendered periodically conductive by said waveform.

10. The combination according to claim 7 wherein said first circuit is capable of producing waveforms of a variety of shapes, circuit means are provided for selecting a given one of said shapes, and said output signal and the energization of said gap adjusting means are productive of control characteristics substantially and respectively identical to said waveforms shapes.